United States Patent
Lim et al.

(10) Patent No.: US 10,234,693 B2
(45) Date of Patent: Mar. 19, 2019

(54) DISPLAY DEVICE

(71) Applicant: SAMSUNG DISPLAY CO., LTD., Yongin-si, Gyeonggi-do (KR)

(72) Inventors: Sanghoon Lim, Cheonan-si (KR); Jongsung You, Asan-si (KR); Yeol Choi, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 482 days.

(21) Appl. No.: 15/001,125

(22) Filed: Jan. 19, 2016

(65) Prior Publication Data

US 2016/0369131 A1 Dec. 22, 2016

(30) Foreign Application Priority Data

Jun. 22, 2015 (KR) .................... 10-2015-0088420

(51) Int. Cl.
| | | |
|---|---|---|
| *G02B 1/11* | (2015.01) | |
| *G02B 27/28* | (2006.01) | |
| *G02B 5/00* | (2006.01) | |
| *G02B 1/14* | (2015.01) | |

(52) U.S. Cl.
CPC .............. *G02B 27/286* (2013.01); *G02B 1/14* (2015.01); *G02B 5/003* (2013.01)

(58) Field of Classification Search
CPC .......... F02K 9/40; F02K 9/64; F05D 2260/20; G02B 1/14; G02B 27/286; G02B 5/003
See application file for complete search history.

(56) References Cited

U.S. PATENT DOCUMENTS

2014/0071537 A1* 3/2014 Park .................... G02B 7/00
359/614

FOREIGN PATENT DOCUMENTS

| KR | 10-2006-0088520 A | 8/2006 |
|---|---|---|
| KR | 10-2010-0076154 A | 7/2010 |

(Continued)

OTHER PUBLICATIONS

Alexander, M.R., et al., A study of HMDSO/$O_2$ plasma deposits using a high-sensitivity and- energy resolution XPS instrument: curve fitting of the Si 2p core level, Applied Surface Science, 1999, pp. 179-183, vol.-Issue No. 137, Elsevier Science B.V.

(Continued)

*Primary Examiner* — Michael B Nelson
(74) *Attorney, Agent, or Firm* — Lewis Roca Rothgerber Christie LLP

(57) ABSTRACT

A display device includes: a display panel configured to display an image; a window on the display panel, the window having a display area at which the image is displayed and a non-display area around the display area; and a first adhesive layer between the display panel and the window, wherein the window includes: a window substrate on the display panel; a first hard coating layer at a first surface of the window substrate; a second hard coating layer at a second surface of the window substrate opposite to the first surface; a protection layer on the first hard coating layer; an auxiliary adhesive layer on the second hard coating layer; a base film on the auxiliary adhesive layer; and a second adhesive layer between the auxiliary adhesive layer and the base film.

14 Claims, 9 Drawing Sheets

(56) References Cited

FOREIGN PATENT DOCUMENTS

KR  10-2014-0058762 A  5/2014
KR  10-1491974 B1  2/2015

OTHER PUBLICATIONS

Kumar, A., et al., Patterning Self-Assembled Monolayers: Applications in Materials Science, Longmuir, 1994, pp. 1498-1511, vol. 10, No. 5, American Chemical Society.
Ye, T., et al., Mechanism of UV Photoreactivity of Alkylsiloxane Self-Assembled Monolayers, Journal of Physical Chemistry B, 2005, pp. 9927-9938, vol. 109, No. 20, American Chemical Society.

* cited by examiner

DISPLAY DEVICE

CROSS-REFERENCE TO RELATED APPLICATION

This application claims priority to, and the benefit of, Korean Patent Application No. 10-2015-0088420, filed on Jun. 22, 2015, with the Korean Intellectual Property Office (KIPO), the disclosure of which is incorporated herein in its entirety by reference.

BACKGROUND

1. Field

Embodiments of the present invention relate to a display device.

2. Description of the Related Art

In general, a slim-type display window is widely used in televisions ("TV"), digital cameras, laptop computers, navigation units, mobile phones, and the like. Such a display window may be formed of transparent plastics, such as poly(methyl methacrylate) ("PMMA"), polyethylene terephthalate ("PET"), or polycarbonate ("PC"), which have a relatively high transparency. However, due to various characteristics thereof, such as relatively low surface hardness or chemical resistance, a display window may need to undergo a hard coating process, such as UV-curable coating or the like, to increase surface hardness.

A display window may be designed to have various colors through the use of a decoration layer. The decoration layer may be provided by printing directly on the display window or attaching a printed film thereto. When the decoration layer is attached as the printed film, adhesion between the hard coating layer and the decoration layer of the display window may decrease, thus leading to attachment therebetween that is not secure.

Accordingly, various attempts have been made to enhance the adhesion of the hard coating layer. For example, a plasma treatment for enhancing the adhesion of the hard coating layer may be used. However, in this case, the display window may be bent by heat generated during the plasma treatment. Thus, there is a need for a surface treatment scheme (or process) that may achieve secure attachment between the hard coating layer and the decoration layer without affecting the display window.

It is to be understood that this background section is merely intended to provide useful background information for understanding the technology and, as such, may include ideas, concepts or recognitions that do not form prior art.

SUMMARY

Aspects of embodiments of the present invention are directed to a display device capable of preventing or reducing peeling-off that may occur between a hard coating layer and a decoration layer of a window.

According to one or more exemplary embodiments of the present invention, a display device includes: a display panel configured to display an image; a window on the display panel, the window having a display area at which the image is displayed and a non-display area around the display area; and a first adhesive layer between the display panel and the window, wherein the window includes: a window substrate on the display panel; a first hard coating layer at a first surface of the window substrate; a second hard coating layer at a second surface of the window substrate opposite to the first surface; a protection layer at the first hard coating layer; an auxiliary adhesive layer on the second hard coating layer; a base film on the auxiliary adhesive layer; and a second adhesive layer between the auxiliary adhesive layer and the base film.

The window substrate may include a plastic substrate.

The protection layer may include a compound represented by the following Chemical Formula 1 or a compound represented by the following Chemical Formula 2:

$$CH_3-(CH_2)_n-Si-X_3; \quad \text{Chemical Formula 1:}$$

$$CF_3-(CF_2)_n-Si-X_3, \quad \text{Chemical Formula 2:}$$

wherein "n" is an integer in a range of 1 to 40, and "X" is alkoxy or halogen.

The protection layer may include an alkylsilane compound or a perfluorosilane compound.

The protection layer may include octyltrichlorosilane, octyltrimethoxysilane, decyltrimethoxysilane, decylmethyldichlorosilane, dodecylchiorosilane, dodecyltrichlorosilane, dodecyltrimethoxysilane, tetradecyltriethoxysilane, tetradecyltrichlorosilane, tetradecyltrimethoxysilane, perfluorooctyltrimethoxysilane, perfluorooctyltrichlorosilane, perfluorodecylmethyldichlorosilane, perfluorodecyltrimethoxysilane, perfluorodecyltriethoxysilane, perfluorododecyltrimethoxysilane, perfluorododecyltrichlorosilane, pefluorotetradecyltrichlorosilane, perfluorotetradecyltrimethoxysilane, or perfluorotetradecyltriethoxysilane.

The auxiliary adhesive layer may include a compound represented by the following Chemical Formula:

$$OH-(CH_2)_n-Si-X_3,$$

wherein "n" is an integer in a range of 1 to 40, and "X" is alkoxy or halogen.

The auxiliary adhesive layer may include a siloxane (Si—OH) bond.

The auxiliary adhesive layer may include a compound represented by the following Chemical Formula:

$$COOH-(CH_2)_n-Si-X_3,$$

wherein "n" is an integer in a range of 1 to 40, and "X" is alkoxy or halogen.

The auxiliary adhesive layer may have a contact angle of about 60 degrees or less.

The first hard coating layer and the second hard coating layer may include an ultraviolet-curable hard coating composition.

The first hard coating layer and the second hard coating layer may include an acrylate-based monomer and/or an inorganic compound.

The display device may further include a light shielding layer at a surface of the base film in the non-display area.

The light shielding layer may include a black printing layer.

The light shielding layer may contact the first adhesive layer.

The display panel may include: a first substrate; a second substrate on the first substrate; and a polarizer on the second substrate and facing the window.

The first adhesive layer may be between the polarizer and the window.

The foregoing is illustrative only and is not intended to be in any way limiting. In addition to the illustrative aspects and embodiments described above, further aspects and embodiments will become apparent by reference to the drawings and the following detailed description.

BRIEF DESCRIPTION OF THE DRAWINGS

The above and other aspects of embodiments of the present invention will be more clearly understood from the following detailed description taken in conjunction with the accompanying drawings, in which.

DETAILED DESCRIPTION

Figure 1:
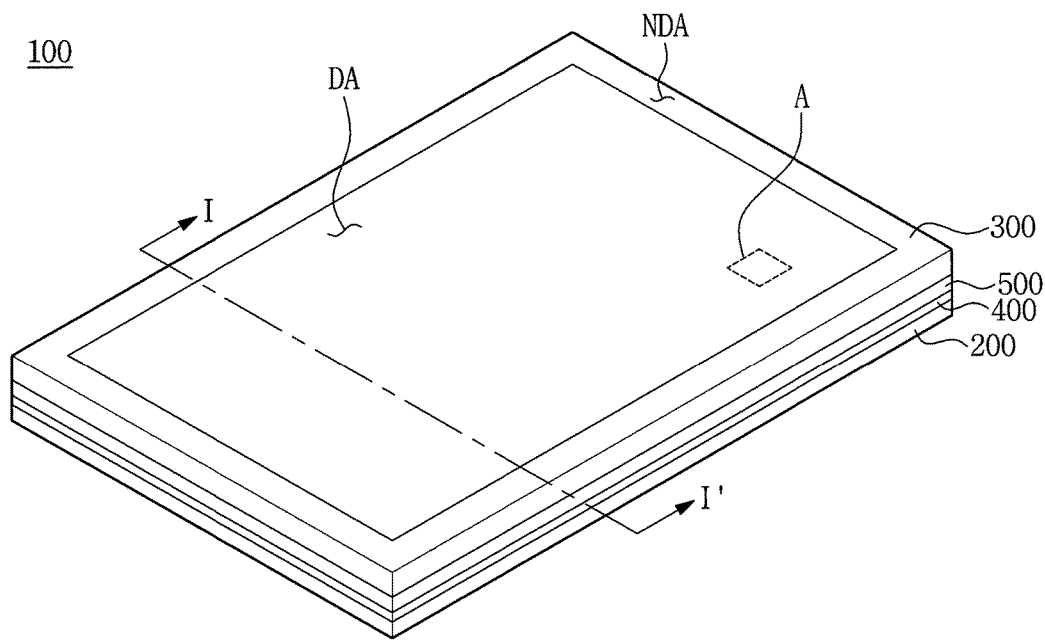
FIG. 1 is a perspective view illustrating a display device according to one or more exemplary embodiments of the present invention.

Aspects of embodiments of the present invention and methods for achieving them will be made clear from exemplary embodiments described below in detail with reference to the accompanying drawings. The present invention may, however, be embodied in many different forms and should not be construed as being limited to the exemplary embodiments set forth herein. Rather, these exemplary embodiments are provided so that this disclosure will be thorough and complete, and will fully convey the scope of the invention to those skilled in the art. Therefore, well-known constituent elements, operations and techniques are not described in detail in the exemplary embodiments in order to prevent the present invention from being obscurely interpreted. Like reference numerals refer to like elements throughout the specification.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms, including "at least one," unless the content clearly indicates otherwise. "Or" means "and/or." As used herein, the term "and/or" includes any and all combinations of one or more of the associated listed items. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof. Expressions, such as "at least one of," when preceding a list of elements, modify the entire list of elements and do not modify the individual elements of the list.

In the drawings, thicknesses of a plurality of layers and areas may be illustrated in an enlarged manner for clarity and ease of description thereof. As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

Hereinafter, exemplary embodiments of a display device according to the present invention are explained with respect to an organic light emitting diode ("OLED") display device. However, the present invention is not limited thereto, and features of the invention may also be applied to, for example, a liquid crystal display ("LCD") device, a plasma display panel ("PDP") device, a field emission display ("FED") device, and the like.

In addition, in the accompanying drawings, the display device according to one or more exemplary embodiments of the present invention is illustrated as an active matrix organic light emitting diode ("AMOLED") display device having a 2Tr-1Cap structure in which a single pixel includes two thin film transistors and a single capacitor. However, the present invention is not limited thereto. Thus, in the OLED display device according to one or more exemplary embodiments of the present invention, the number of thin film transistors, the number of capacitors, and the number of wirings are not limited. As used herein, the term "pixel" refers to a minimum unit for displaying an image, and the OLED display device displays an image through a plurality of pixels.

Unless otherwise defined, all terms used herein (including technical and scientific terms) have the same meaning as commonly understood by those skilled in the art. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Hereinafter, a display device 100 according to one or more exemplary embodiments of the present invention is described with reference to FIGS. 1 and 2.

FIG. 1 is a perspective view illustrating a display device 100 according to one or more exemplary embodiments of the present invention.

Referring to FIG. 1, a surface (e.g., an upper surface) of the display device 100 includes a display area DA and a non-display area NDA formed around the display area DA. As referred to herein, the display area DA is an area in which an image is displayed (or provided) to an observer. Similarly, the non-display area NDA is defined as an area in which an image is not displayed. The non-display area NDA may be printed in black. However, the present invention is not limited thereto, and the non-display area NDA may be printed in various colors. For example, in some exemplary embodiments, the non-display area NDA may be printed in white.

The upper surface of the display device 100 substantially corresponds to a first surface (e.g., an upper surface) of a window 300, and the configuration thereof is further described below with reference to FIG. 2.

Figure 2:
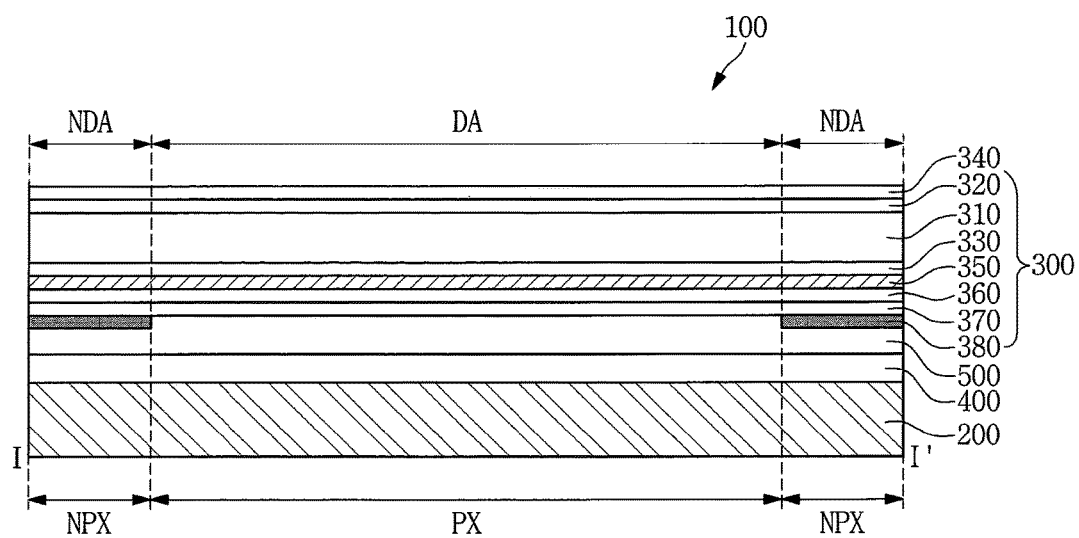
FIG. 2 is a cross-sectional view taken along the line I-I' of FIG. 1.

FIG. 2 is a cross-sectional view taken along the line I-I' of FIG. 1.

Referring to FIG. 2, the display device 100 includes a display panel 200, the window 300 on the display panel 200, and a first adhesive layer 500 interposed between the display panel 200 and the window 300.

The display panel 200 includes a pixel area PX and a non-pixel area NPX, and the window 300 includes the display area DA and the non-display area NDA. The non-pixel area NPX is provided around the pixel area PX, and the non-display area NDA is provided around the display area DA. The pixel area PX of the display panel 200 generally corresponds to the display area DA of the window 300, and the non-pixel area NPX of the display panel 200 generally corresponds to the non-display area NDA of the window 300.

The display panel 200 is configured to display an image. The image displayed on the display panel 200 is transmitted through the window 300 to be displayed (or provided) to a user.

As referred to herein, the pixel area PX of the display panel 200 is an area in which an image is generated and displayed, and the non-pixel area NPX of the display panel 200 is an area in which an image is not generated. The display panel 200 may include a plurality of pixels in the pixel region PX. In addition, the display panel 200 may include a driving unit for driving pixels in the non-pixel area NPX. The pixels may be driven by the driving unit to generate an image (e.g., a predetermined image).

The display panel 200 may be a self-emission-type display panel, such as an OLED display device, or a non-self-emission-type display panel, such as an LCD device and an electrophoretic display ("EPD") panel. Additional description of the display panel 200 is provided below with reference to FIG. 5.

The window 300 is disposed above the display panel 200 so as to protect the display panel 200 from external scratches.

The window 300 may include a window substrate 310, hard coating layers 320 and 330, a protection layer 340, an auxiliary adhesive layer 350, and a base film 370.

A planar area of the window substrate 310 includes the display area DA and the non-display area NDA formed around the display area DA, in a manner similar to a planar area of the window 300. The window substrate 310 is disposed to oppose the display panel 200.

The window substrate 310 may have a quadrangular planar shape having substantially the same size as that of the display panel 200. However, the present invention is not limited thereto, and the window substrate 310 may have various suitable shapes and may have, for example, a round corner portion or a curved corner portion.

The window substrate 310 may include (or may be formed of) light-transmissive transparent plastics, such as poly(methyl methacrylate) ("PMMA"), polyethylene terephthalate (PET") and/or polycarbonate ("PC"), or may use a base film. Accordingly, the image generated on the display panel 200 may be transmitted through the window substrate 310 to be displayed (or provided) to a user.

The hard coating layers 320 and 330 are respectively disposed on first and second surfaces (e.g., upper and lower surfaces) of the window substrate 310, (e.g., opposing surfaces of the window substrate 310).

In some exemplary embodiments, a first hard coating layer 320 may be disposed on the first surface (e.g., the upper surface) of the window substrate 310, and a second hard coating layer 330 may be disposed on the second surface (e.g., the lower surface) of the window substrate 310. However, each of the first and second hard coating layers 320 and 330 may be disposed on one surface of the window substrate 310, that is, on the upper surface or the lower surface of the window substrate 310.

The first and second hard coating layers 320 and 330 may be formed on the window substrate 310 by coating hard coating compositions on the window substrate 310 and then being cured. The hard coating composition may include a thermosetting composition and/or an ultraviolet ("UV")-curable composition. However, any suitable coating composition capable of enhancing the surface hardness of the window substrate 310 may be utilized. Because the thermosetting composition requires a high temperature treatment, the thermosetting composition may not be preferred when a plastic substrate is utilized. As such, the UV-curable composition, which does not require a high temperature treatment, may be particularly useful in embodiments having a plastic substrate.

In the presently described exemplary embodiment, the first and second hard coating layers 320 and 330 may include (or may be formed of) an acrylate-based monomer and/or an inorganic compound.

Examples of the acrylate-based monomer may include (hydroxyethyl acrylate ("HEA"), hydroxyethyl methacrylate ("HEMA"), hexanediol diacrylate ("HDDA"), tripropylene glycol diacrylate ("TPGDA"), ethylene glycol diacrylate ('EGDA"), trimethylolpropane triacrylate ("TMPTA"), trimethylolpropane ethoxy triacrylate ("TMPEOTA"), glycerinpropoxylate-triacrylate ("GPTA"), pentaerythritol tetraacrylate ("PETA"), and dipentaerythritol hexaacrylate ("DPHA").

Examples of the inorganic compound may include aluminum oxide, zirconium oxide, titanium oxide, zinc oxide, cerium oxide, tantalum oxide, yttrium oxide, ytterbium oxide, and silicon oxide.

The first and second hard coating layers 320 and 330 may enhance the surface hardness and the chemical resistance of the window substrate 310.

The protection layer 340 and the auxiliary adhesive layer 350 are disposed on the first and second hard coating layers 320 and 330, respectively.

In more detail, the protection layer 340 may be disposed on the first hard coating layer 320 on the upper surface of the window substrate 310 and the auxiliary adhesive layer 350 may be disposed on the second hard coating layer 330 on the lower surface of the window substrate 310.

The protection layer 340 may be a functional coating layer, such as, for example, an anti-finger ("AF") coating layer, an anti-reflection ("AR") coating layer, and/or an anti-glare ("AG") coating layer.

The protection layer 340 may include (or may be formed of) a compound represented by the following Chemical Formula 1 and/or a compound represented by the following Chemical Formula 2:

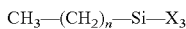

CH$_3$—(CH$_2$)$_n$—Si—X$_3$            Chemical Formula 1:

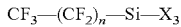

CF$_3$—(CF$_2$)$_n$—Si—X$_3$            Chemical Formula 2:

In the Chemical Formulas 1 and 2, "n" is an integer in a range between and including 1 to 40, and "X" is alkoxy or halogen.

The protection layer 340 may include (or may be formed of) an alkylsilane compound and/or a perfluorosilane compound. In more detail, the protection layer 340 may include (or may be formed of) octyltrichlorosilane, octyltrimethoxysilane, decyltrimethoxysilane, decylmethyldichlorosilane, dodecyichlorosilane, dodecyltrichlorosilane, dodecyltrimethoxysilane, tetradecyltriethoxysilane, tetradecyltrichlorosilane, tetradecyltrimethoxysilane, perfluorooctyltrimethoxysilane, perfluorooctyltrichlorosilane, perfluorodecylmethyldichlorosilane, perfluorodecyltrimethoxysilane, perfluorodecyltriethoxysilane, perfluorododecyltrimethoxysilane, perfluorododecyltrichlorosilane, pefluorotetradecyltrichlorosilane, perfluorotetradecyltrimethoxysilane, and/or perfluorotetradecyltriethoxysilane.

The protection layer 340 may be a self-assembled monolayer ("SAM"). As used herein, the term "self-assembled monolayer" ("SAM") refers to a relatively well-organized assembly of organic molecules formed spontaneously on a surface of a substrate.

The following Chemical Formula 3 provides an example of a self-assembled molecule that forms a self-assembled monolayer ("SAM"), such as octadecyltrichlorosilane [CH$_3$(CH$_2$)$_{17}$SiCl$_3$]. As represented in the Chemical Formula 3, the self-assembled molecule includes a reactive group, an alkane chain, and a functional group, and a surface property of a substrate is determined based on the functional group.

Chemical Formula 3

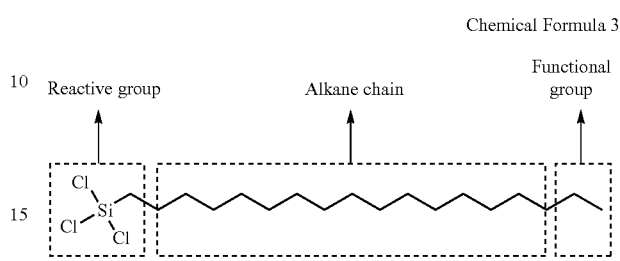

The protection layer 340 which is a self-assembled monolayer ("SAM") formed of such self-assembled molecules may enhance wettability, a lubricating property, corrosion resistance, and the like, of a surface of the window substrate 310. The protection layer 340 may serve as a coating layer capable of performing various functions, such as, for example, an anti-finger ("AF") coating layer, an anti-reflection ("AR") coating layer, and/or an anti-glare ("AG") coating layer, based on the type of a functional group of the self-assembled molecule.

The auxiliary adhesive layer 350 is disposed on the second hard coating layer 330 on the lower surface of the window substrate 310 to enhance adhesion.

The auxiliary adhesive layer 350 may include a compound represented by the following Chemical Formula 4 and/or a compound represented by the following Chemical Formula 5:

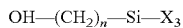

OH—(CH$_2$)$_n$—Si—X$_3$            Chemical Formula 4:

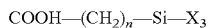

COOH—(CH$_2$)$_n$—Si—X$_3$            Chemical Formula 5:

In Chemical Formulas 4 and 5, "n" is an integer in a range between and including 1 to 40, and "X" is alkoxy or halogen.

The auxiliary adhesive layer 350 is formed by disposing a layer on the second hard coating layer 330 that is, the auxiliary adhesive layer 350 may be formed in the same or substantially the same manner as the protection layer 340 on the first hard coating layer 320, and performing UV irradiation thereon. However, the present invention is not limited thereto, and the auxiliary adhesive layer 350 may be formed, for example, by coating a compound having a hydroxyl group (—OH) or a carboxyl group (—COOH) at an end thereof directly on the second hard coating layer 330.

The auxiliary adhesive layer 350 having a hydrophilic surface is disposed on the second hard coating layer 330 having a hydrophobic surface to thereby enhance adhesion of the second hard coating layer 330, such that the second hard coating layer 330 and the base film 370 (on which a light shielding layer 380 is disposed) may be securely attached to one another. Additional description of effects of enhanced adhesion due to the disposition of the auxiliary adhesive layer 350 is provided below with reference to FIGS. 3A and 3B.

The base film 370 may be disposed on a lower surface of the auxiliary adhesive layer 350.

The base film 370 may use any suitable light-transmissive transparent film, such as, for example, a polyethylene terephthalate ("PET") film, but the present invention is not limited thereto. In addition, the base film 370 may include a second adhesive layer 360 formed thereon, such as, for example, a pressure sensitive adhesive ("PSA"). The base film 370 may also include the light shielding layer 380 printed on a surface thereof.

In more detail, the light shielding layer 380 may be disposed on a portion of a surface (e.g., a lower surface) of the base film 370 corresponding to the non-display area NDA of the window 300. The base film 370 on which the light shielding layer 380 is disposed may be referred to as a decoration film or a decoration layer.

The light shielding layer 380 is disposed on the base film 370 in the non-display area NDA. The light shielding layer 380 may include (or may be formed of) an organic material having a color (e.g., a predetermined color). Accordingly, the color of the light shielding layer 380 in the non-display area NDA of the window 300 may be displayed to a user.

The light shielding layer 380 may prevent the driving unit for driving the display panel 200 and an accommodating portion in which the display panel 200 is accommodated from being visible to a user.

The light shielding layer 380 may have various colors including, for example, black or white. When the light shielding layer 380 is black, the light shielding layer 380 may include a black matrix. When the light shielding layer 380 is white, the light shielding layer 380 may include (or may be formed of) an organic insulating material, such as a white resin, or the like. In some exemplary embodiments, the light shielding layer 380 may include (or may be formed of) an opaque inorganic insulating material, such as CrOx and/or MoOx, and/or an opaque organic insulating material, such as a black resin. Accordingly, the light shielding layer 380 may block light from and/or to the display panel 200, prevent the visibility of an internal structure of the display panel 200, and determine the color of the window 300.

In some embodiments, the light shielding layer 380 may have a monolayer structure. However, the present invention is not limited thereto, and the light shielding layer 380 may have a multilayer structure including a plurality of layers having the same thickness as one another or having different thicknesses from one another.

The light shielding layer 380 contacts the first adhesive layer 500 interposed between the display panel 200 and the window 300.

The first adhesive layer 500 may be a resin, such as a photocurable resin. When photoinitiators included in the resin (e.g., included in a relatively small amount) receive light, such as UV light, a photopolymerization reaction commences such that a monomer and an oligomer temporarily form a polymer to be cured.

A polarizer 400 is disposed on the display panel 200, for example, between the display panel 200 and the first adhesive layer 500. The polarizer 400 may shift an optical axis of the light irradiated from the display panel 200.

The polarizer 400 may be formed to have substantially the same size as that of the display panel 200 so as to cover the display panel 200. The polarizer 400 may have a monolayer structure or may have a multilayer structure including a plurality of layers including a polarizing film and a retardation film.

Hereinafter, the effects of enhanced adhesion due to the disposition of the auxiliary adhesive layer 350 are described with reference to FIGS. 3A and 3B.

Figure 3A:
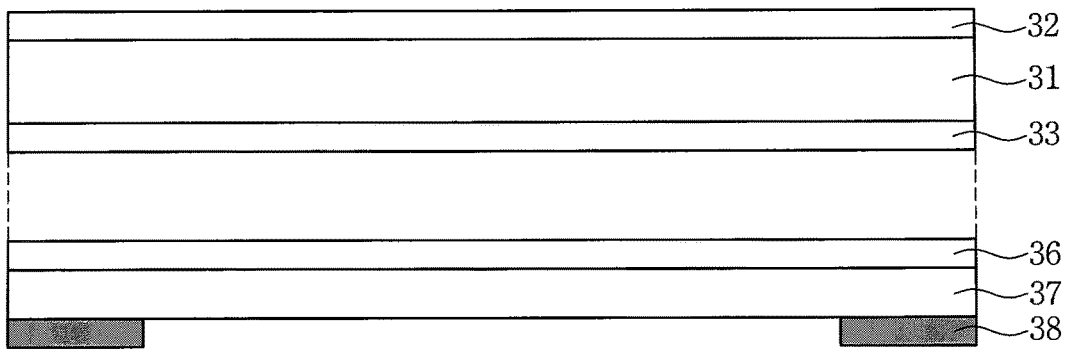
FIGS. 3A-3B are cross-sectional views illustrating a comparison between a general window and a window of the display device of FIG. 1.
Figure 3B:
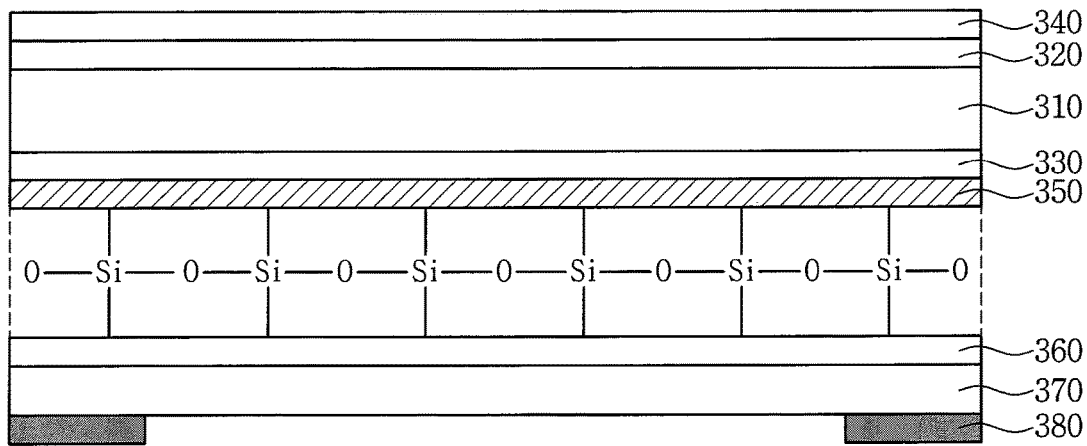

FIGS. 3A and 3B are cross-sectional views illustrating a comparison between a general window 30 and the window 300 of the display panel 100 of FIG. 1.

Referring to FIGS. 3A and 3B, FIG. 3A illustrates the general window 30, and FIG. 3B illustrates the window 300 according to one or more exemplary embodiments of the present invention.

For ease of description, FIG. 3A illustrates a window substrate 31, on which hard coating layers 32 and 33 are disposed, and a base film 37, on which a light shielding layer 38 is disposed, separate from one another, and FIG. 3B illustrates the window substrate 310, on which the first and second hard coating layers 320 and 330 are disposed, and the base film 370, on which the light shielding layer 380 is disposed, separate from one another. In addition, while FIG. 3B illustrates an example of coupling between the auxiliary adhesive layer 350 and the second adhesive layer 360, the illustrated example may be exaggerated to better illustrate the coupling. Thus, FIG. 3B may not illustrate an actual proportional thickness of the coupling between the auxiliary adhesive layer 350 and the second adhesive layer 360.

In FIGS. 3A and 3B, the window substrates 31 and 310 are illustrated as plastic substrates, and the base films 37 and 370 are illustrated as respectively including the second adhesive layers 36 and 360, such as pressure sensitive adhesives ("PSA"). However, the configurations of the windows 30 and 300 are not limited thereto, and a base film including other adhesive components or a base film having inherent adhesiveness may be applied, for example.

In general, it is difficult to form a light shielding layer by printing a printing composition directly on a window substrate formed of a transparent plastic. As such, as illustrated in FIGS. 3A and 3B, a manner of bonding the base films 37 and 370, including the light shielding layers 38 and 380 formed by printing compositions, to the window substrates 31 and 310, respectively, may be used.

The window 30 includes the window substrate 31, first and second hard coating layers 32 and 33 on opposing surfaces of the window substrate 31, and the base film 37 including the light shielding layer 38 on a non-display area thereof.

In the configuration of the window 30, the base film 37, on which the light shielding layer 38 is disposed, is bonded to the second hard coating layer 33 that is on a lower surface of the window substrate 31 to form the window 30. As such, because the second hard coating layer 33 has a hydrophobic surface, adhesion between the second hard coating layer 33 and the base film 37 may be relatively weak. Accordingly, secure attachment between the second hard coating layer 33 and the base film 37 of the window 30 may not be achieved, and thus bubble generation or a peeling-off phenomenon may occur.

The window 300 according to one or more exemplary embodiments of the present invention includes the window substrate 310, the first and second hard coating layers 320 and 330 on opposing surfaces of the window substrate 310, the protection layer 340 on the first hard coating layer 320, the auxiliary adhesive layer 350 on the second hard coating layer 330, and the base film 370 including the light shielding layer 380 on the non-display area thereof.

The window 300 according to one or more exemplary embodiments of the present invention may enhance adhesion between the second hard coating layer 330 and the base film 370 by disposing the auxiliary adhesive layer 350 on the second hard coating layer 330.

In more detail, the auxiliary adhesive layer 350 having a hydrophilic surface may be disposed on the second hard coating layer 330 to enhance the adhesion of the second hard coating layer 330 by forming siloxane bonding (Si—O) between the second adhesive layer 360 on the base film 370 and the auxiliary adhesive layer 350. Accordingly, secure attachment between the second hard coating layer 330 and the base film 370 may be achieved, such that bubble generation or a peeling-off phenomenon may be prevented or the likelihood thereof may be reduced. Thus, the window 300 according to one or more exemplary embodiments of the present invention may provide the same or substantially the same features as that of a glass window in which bubble generation and the peeling-off phenomenon are absent.

Hereinafter, a pixel of the display panel 200 (refer to FIG. 1) is described with reference to FIGS. 4 and 5.

Figure 4:
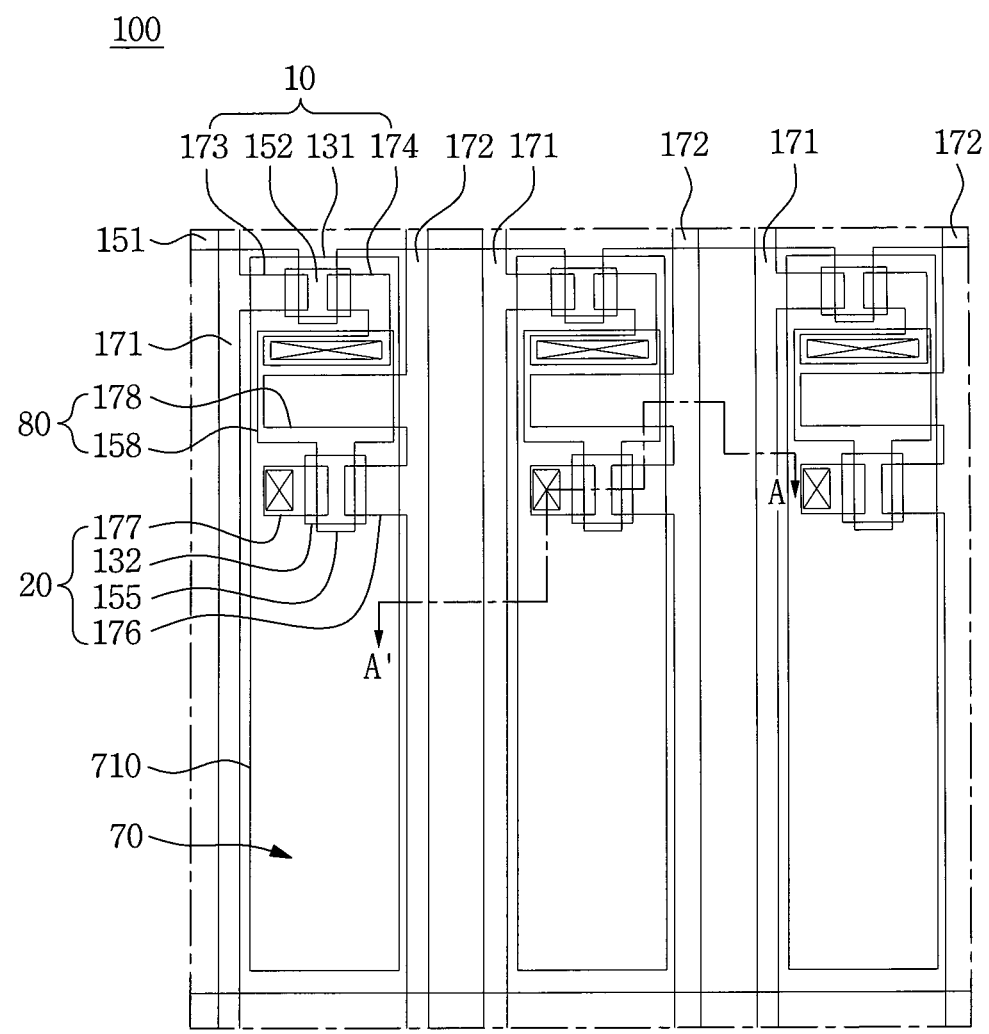
FIG. 4 is a plan view illustrating a pixel of a display panel in the area "A" of FIG. 1.
Figure 5:
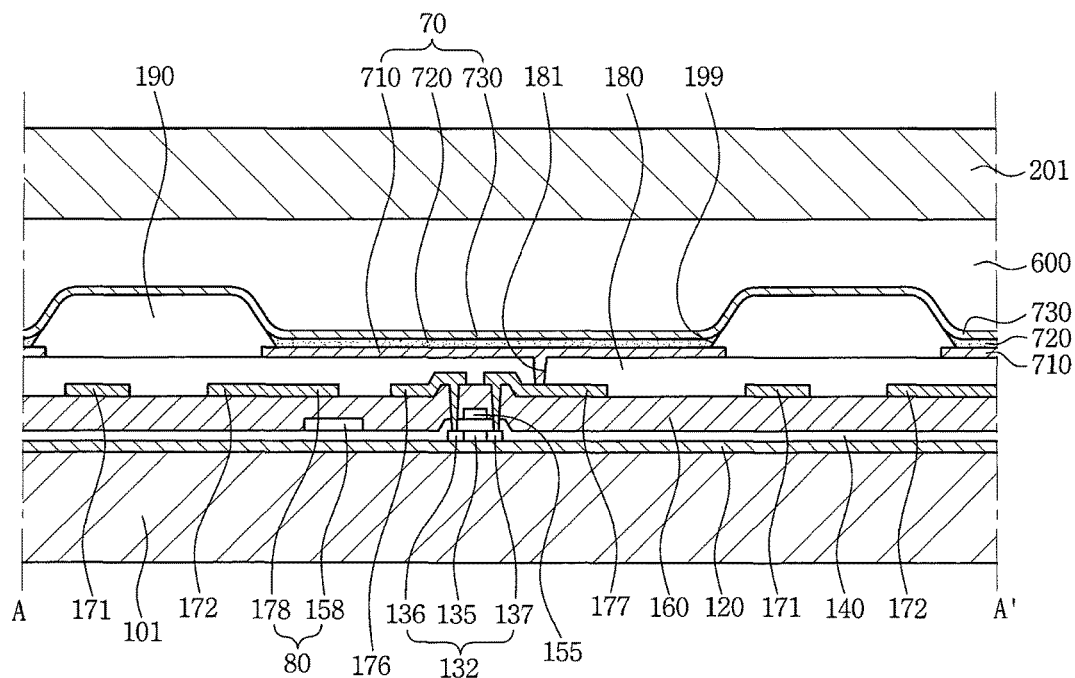
FIG. 5 is a cross-sectional view taken along the line A-A' of FIG. 4.

FIG. 4 is a plan view illustrating a pixel of the display panel 200 (refer to FIG. 1) in the area "A" of FIG. 1 and FIG. 5 is a cross-sectional view taken along the line A-A' of FIG. 4.

Referring to FIGS. 4 and 5, the OLED display device 100 according to one or more exemplary embodiments of the present invention is illustrated as an AMOLED display device having a 2Tr-1Cap structure in which each pixel in the display area DA (refer to FIG. 1) includes two thin film transistors ("TFT"), for example, a switching TFT 10 and a driving TFT 20, and a single capacitor, for example, a capacitor 80. However, the present invention is not limited thereto.

Accordingly, the OLED display device 100 may have various suitable structures, for example, a structure in which three or more TFTs and two or more capacitors are included in a pixel and an additional wiring is further included. As used herein, the term "pixel" refers to a minimum unit for displaying an image, and the display area may display an image using a plurality of pixels.

The OLED display device 100 includes a first substrate 101, and the switching TFT 10, the driving TFT 20, the capacitor 80, and an OLED 70 that are respectively formed in the plurality of pixels defined in the first substrate 101. The first substrate 101 further includes a gate line 151 disposed in a direction, and a data line 171 and a common power line 172 that each cross (e.g., intersect) the gate line 151 and are insulated from the gate line 151.

In some embodiments, each pixel may be defined by the gate line 151, the data line 171, and the common power line 172; however, the present invention is not limited thereto.

The OLED 70 may include a first electrode 710, an organic light emitting layer 720 formed on the first electrode 710, and a second electrode 730 formed on the organic light emitting layer 720. In some embodiments, each pixel may include one or more first electrodes 710 formed thereon, and accordingly, the first substrate 101 may have the plurality of first electrodes 710 spaced (e.g., spaced apart) from one another.

In some embodiments, the first electrode 710 may be a positive electrode (e.g., an anode), for example, a hole injection layer ("HIL"), and the second electrode 730 may be a negative electrode (e.g., a cathode), for example, an electron injection layer ("EIL"). However, the present invention is not limited thereto, and the first electrode 710 may be a cathode and the second electrode 730 may be an anode based on a driving scheme (or process) of the OLED display device 100. In addition, in some embodiments, the first electrode 710 is a pixel electrode and the second electrode 730 is a common electrode.

Holes and electrons injected into the organic light emitting layer 720 are combined with one another to form excitons. The OLED 70 emits light by energy generated when the excitons fall from an excited state to a ground state.

The capacitor 80 includes a pair of storage electrodes, for example, first and second storage electrodes 158 and 178, that are disposed to have an insulating layer 160 therebetween. In some embodiments, the insulating layer 160 may be a dielectric material. Capacitance of the capacitor 80 may be determined by an amount of electric charge stored in the capacitor 80 and the level of voltage across the first and second storage electrodes 158 and 178.

The switching TFT 10 includes a switching semiconductor layer 131, a switching gate electrode 152, a switching source electrode 173, and a switching drain electrode 174. The driving TFT 20 includes a driving semiconductor layer 132, a driving gate electrode 155, a driving source electrode 176, and a driving drain electrode 177.

The switching TFT 10 may be used as a switching element, which determines when the respective pixel emits light. The switching gate electrode 152 is connected to the gate line 151. The switching source electrode 173 is connected to the data line 171. The switching drain electrode 174 is spaced from the switching source electrode 173 and is connected to the first storage electrode 158.

The driving TFT 20 applies, to the first electrode 710, a driving power for emitting the organic light emitting layer 720 of the OLED 70 within the pixel selected by the switching TFT 10. The driving gate electrode 155 is connected to the first storage electrode 158, which is connected to the switching drain electrode 174. The driving source electrode 176 and the second storage electrode 178 are connected to the common power line 172.

The driving drain electrode 177 is connected to the first electrode 710 of the OLED 70 through a drain contact opening (e.g., a drain contact hole) 181.

Due to the configuration of the switching TFT 10 and the driving TFT 20 as described above, the switching TFT 10 is operated by a gate voltage applied to the gate line 151 to transmit a data voltage applied to the data line 171 to the driving TFT 20.

A voltage having a level substantially equal to a difference between a level of a common voltage applied from the common power line 172 to the driving TFT 20 and a level of the data voltage transmitted from the switching TFT 10 is stored in the capacitor 80. A current having a level corresponding to the level of the voltage stored in the capacitor 80 flows into the OLED 70 through the driving TFT 20 to enable the OLED 70 to emit light.

The configuration of the OLED display device 100 according to one or more exemplary embodiments is described further below with reference to FIGS. 4 and 5.

The stacked structure of the switching TFT 10, which includes the switching semiconductor layer 131, the switching gate electrode 152, the switching source electrode 173, and the switching drain electrode 174, is the same as or similar to that of the driving TFT 20, which includes the driving semiconductor layer 132, the driving gate electrode 155, the driving source electrode 176, and the driving drain electrode 177. As such, a repeated description thereof is omitted herein for conciseness.

In the presently described exemplary embodiment, the first substrate 101 may be an insulating substrate formed of glass, quartz, ceramic, plastic, or the like. However, the first substrate 101 is not limited thereto, and the first substrate 101 may be a metallic substrate formed of stainless steel or the like, for example.

A buffer layer 120 is disposed on the first substrate 101. The buffer layer 120 may prevent or reduce the infiltration of impure elements into the OLED display device 100 and may planarize (or flatten) a surface of the first substrate 101.

The buffer layer 120 may include (or may be formed of) silicon nitride ($SiN_x$), silicon oxide ($SiO_2$), and/or silicon oxynitride ($SiO_XN_Y$). However, in some embodiments, the buffer layer 120 may be omitted based on the type of the first substrate 101, process conditions, and the like.

The driving semiconductor layer 132 is disposed on the buffer layer 120. The driving semiconductor layer 132 may include (or may be formed of) polycrystalline silicon, amorphous silicon, and/or an oxide semiconductor.

A gate insulating layer 140 is disposed on the driving semiconductor layer 132. The gate insulating layer 140 may include tetraethyl orthosilicate ("TEOS"), $SiN_X$, and/or $SiO_2$.

The driving gate electrode 155, the gate line 151 (refer to FIG. 4), and the first storage electrode 158 are formed on the gate insulating layer 140. In some embodiments, the driving gate electrode 155 is disposed to overlap at least a portion of the driving semiconductor layer 132, for example, a channel region 135 of the driving semiconductor layer 132. The driving gate electrode 155 may block impurities from being doped in the channel region 135 when impurities are doped in the source region 136 and the drain region 137 of the driving semiconductor layer 132 during formation of the driving semiconductor layer 132.

The driving gate electrode 155 and the first storage electrode 158 are disposed on the same layer and are formed of the same or substantially the same metal. In some embodiments, the metal that forms the driving gate electrode 155 and the first storage electrode 158 may include molybdenum (Mo), chromium (Cr), and/or tungsten (W).

The insulating layer 160 is disposed on the gate insulating layer 140 to cover the driving gate electrode 155. The insulating layer 160 may be an insulating interlayer. The insulating layer 160 may include (or may be formed of) $SiN_X$, $SiO_X$, or the like in a manner similar to that of the gate insulating layer 140. The gate insulating layer 140 and the insulating layer 160 include contact openings (e.g., contact holes), through which the source region 136 and the drain region 137 of the driving semiconductor layer 132 are respectively exposed.

The driving source electrode 176, the driving drain electrode 177, the data line 171, the common power line 172, and the second storage electrode 178 are disposed on the insulating layer 160 in the display area DA. The driving source electrode 176 and the driving drain electrode 177 are respectively connected to the source region 136 and the drain region 137 of the driving semiconductor layer 132 through the contact holes.

In the above-described manner, the driving TFT 20, which includes the driving semiconductor layer 132, the driving gate electrode 155, the driving source electrode 176, and the driving drain electrode 177, is formed. However, the configuration of the driving TFT 20 is not limited to the aforementioned example and may be modified in various suitable manners.

A passivation layer 180 is formed on the insulating layer 160 and covers the driving source electrode 176, the driving drain electrode 177, and the like. The passivation layer 180 may include (or may be formed of) an organic material such as polyacrylate, polyimide, or the like. The passivation layer 180 may be a planarization layer.

The drain contact hole 181 is defined through the passivation layer 180, and the driving drain electrode 177 is exposed through the drain contact hole 181.

The first electrode 710 is disposed on the passivation layer 180 and is connected to the driving drain electrode 177 through the drain contact hole 181 of the passivation layer 180.

A pixel defining layer 190 is disposed on the passivation layer 180 and covers the first electrode 710. An aperture 199 is defined through the pixel defining layer 190, and the first electrode 710 is exposed through the aperture 199.

For example, the first electrode 710 corresponds to the aperture 199 of the pixel defining layer 190. The pixel defining layer 190 may include (or may be formed of) a resin, such as a polyacrylate resin or a polyimide resin.

The organic light emitting layer 720 is disposed on the first electrode 710 within the aperture 199 of the pixel defining layer 190, and the second electrode 730 is disposed on the pixel defining layer 190 and the organic light emitting layer 720.

In the above-described manner, the OLED 70, which includes the first electrode 710, the organic light emitting layer 720, and the second electrode 730, is formed.

One of the first electrode 710 and the second electrode 730 may include (or may be formed of) a transparent conductive material, and the other thereof may include (or may be formed of) a transflective conductive material or a reflective conductive material. The OLED display device 100 may be one of a top-emission-type display device, a bottom-emission-type display device, and a both-side emission-type display device based on the type of material utilized to form the first and second electrodes 710 and 730.

The organic light emitting layer 720 may include (or may be formed of) a low molecular weight organic material or a high molecular weight organic material. The organic light emitting layer 720 may have a multilayer structure that includes one or more of the following: a light emitting layer, a hole injection layer ("HIL"), a hole transporting layer ("HTL"), an electron transporting layer ("ETL"), and/or an electron injection layer ("EIL"). For example, the hole injection layer ("HIL") may be disposed on the first electrode 710 having a positive polarity, and the hole transporting layer ("HTL"), the light emitting layer, the electron transporting layer ("ETL"), and the electron injection layer ("EIL") may be sequentially stacked thereon.

In some embodiments, a capping layer may further be disposed on the second electrode 730. The capping layer may protect the OLED 70 and may help light generated in the organic light emitting layer 720 to be efficiently emitted.

A second substrate 201 may be adhered (e.g., sealingly adhered) to the first substrate 101 with the OLED 70 therebetween. The second substrate 201 encapsulates (e.g., sealingly encapsulates) the switching TFT 10, the driving TFT 20, the OLED 70, and the like, which are disposed on the first substrate 101, to protect the encapsulated components from the outside environment. In general, the second substrate 201 may use an insulating substrate formed of glass, plastic, or the like. When the OLED display device 100 is the top-emission-type display device, in which an image is displayed in a direction of the second substrate 201, the second substrate 201 may be formed of a light-transmissive material.

Meanwhile, a buffer material 600 is interposed between the first substrate 101 and the second substrate 201. The buffer material 600 may protect internal components such as the OLED 70 against external impacts applied to the OLED display device 100. Further, the buffer material 600 may enhance the mechanical reliability of the OLED display device 100. The buffer material 600 may include (or may be formed of) at least one of an organic sealant, such as a urethane resin, an epoxy resin, and/or an acrylic resin, and an inorganic sealant, such as silicon.

Hereinafter, a method of manufacturing a display device according to one or more exemplary embodiments of the present invention is described with reference to FIGS. 6A to 6E.

FIGS. 6A to 6E are cross-sectional views illustrating a method of manufacturing the OLED display device 100 according to one or more exemplary embodiments.

The window substrate 310 may be fixed to a window fixing plate S, and hard coating process may be performed on opposing surfaces of the window substrate 310 to respectively form the first hard coating layer 320 and the second hard coating layer 330 thereon. The first hard coating layer 320 and the second hard coating layer 330 may be formed by coating acrylate-based resin compositions on the window substrate 310 and then curing the same. However, the present invention is not limited thereto, and any suitable hard coating process may be used.

Figure 6A:
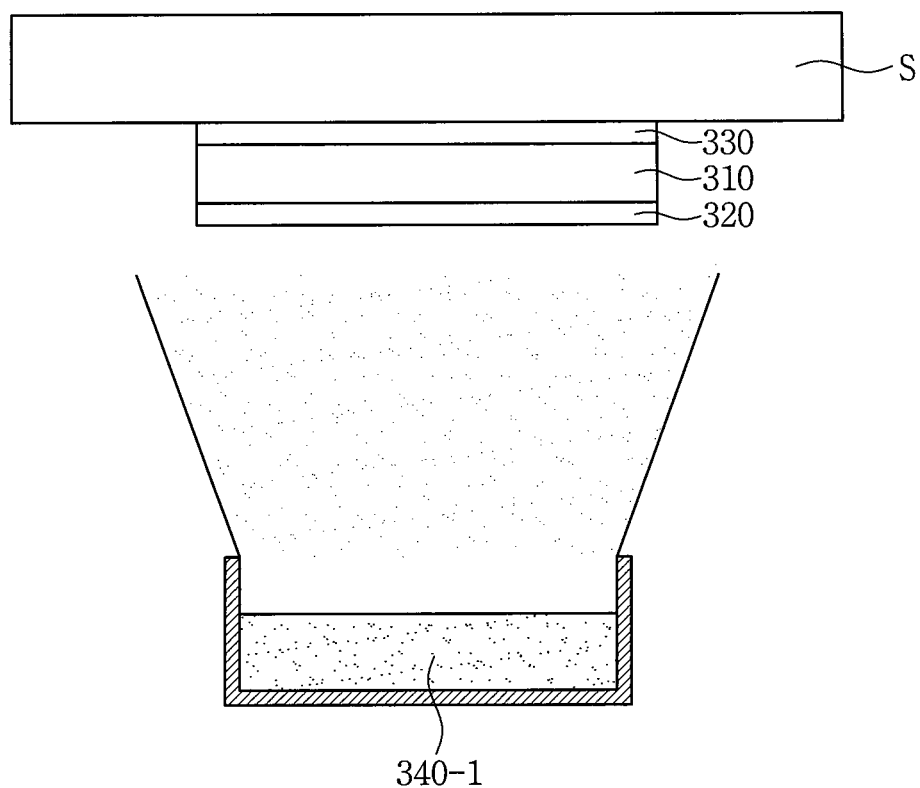
FIGS. 6A-6E are cross-sectional views illustrating a method of manufacturing a display device according to one or more exemplary embodiments of the present invention.
Figure 6B:
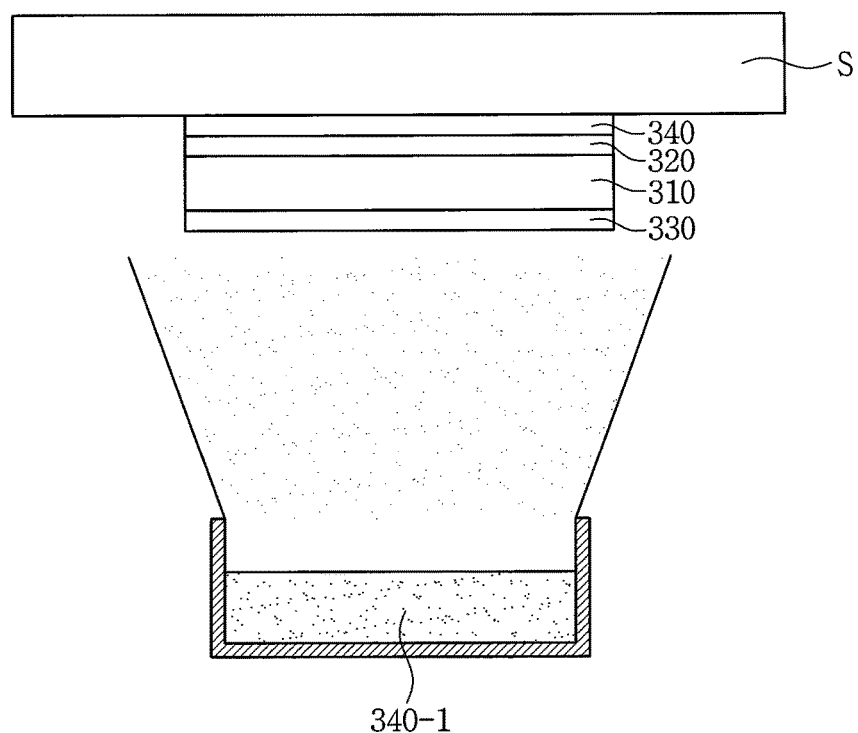

Referring to FIGS. 6A and 6B, the protection layer 340 is formed on the first hard coating layer 320 on the upper surface of the window substrate 310. A coating composition 340-1 for forming the protection layer 340 may utilize an alkylsilane compound and/or a perfluorosilane compound. For example, a compound forming a self-assembled monolayer ("SAM") may be utilized. The compound utilized to form the protection layer 340 is described above with reference to FIG. 2 and, thus, a repeated description thereof may be omitted herein for conciseness.

The coating process may include, for example, a dipping process, a spray process, an evaporation process, or the like. When an electron beam (e-beam) evaporation process is utilized as the coating process, a degree of vacuum may be, for example, in a range of about 0.01 Torr to about 100 Torr. When the dipping process is utilized as the coating process, a coating solution may have a concentration in a range of about 0.01 millimolar (mM) to about 100 mM, for example, and a temperature in a range of about room temperature to about 40 Celsius degrees (° C.), for example. In addition, a period of time for the dipping treatment may be, for example, in a range of about one second to about one hour. When the spray process is utilized as the coating process, the concentration of a coating solution may be, for example, in a range of about 0.01 mM to about 100 mM. Further, the temperature of a surface of a hard coating layer to be sprayed may be, for example, in a range of about room temperature to about 40° C.

While any of the aforementioned coating processes may be used to form the protection layer 340, the e-beam evaporation coating process, for example, may be utilized based on a property of a layer being formed.

The protection layer 340 that is formed on the first hard coating layer 320 may have a thickness in a range of, for example, about 2 nanometers (nm) to about 100 nm. When the thickness of the protection layer 340 is less than 2 nm, the protection layer 340 may not sufficiently protect the window substrate 310. When the thickness of the protection layer 340 is greater than 2 nm, the thinning of the display device may be inhibited (e.g., the display device may be thicker than desired).

Figure 6C:
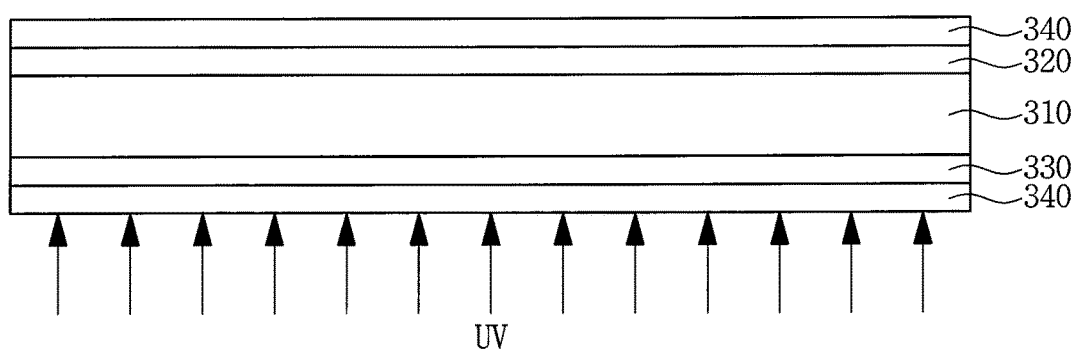
Figure 6D:
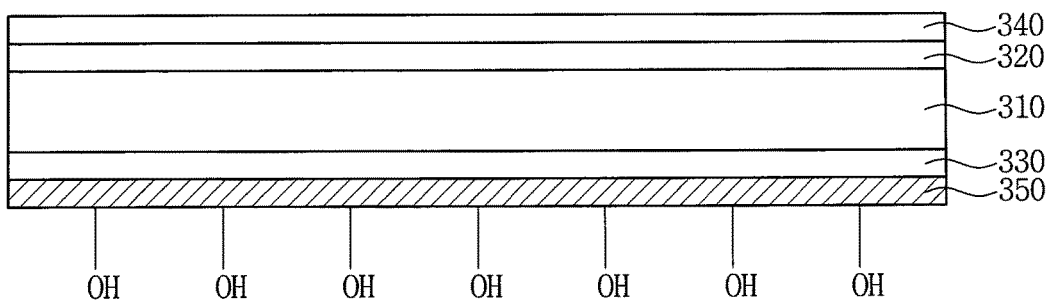

Referring to FIGS. 6B, 6C, and 6D, the auxiliary adhesive layer 350 is formed on the second hard coating layer 330 on the lower surface of the window substrate 310.

In more detail, referring to FIG. 6B, a coating composition 340-1, such as an alkylsilane compound or a perfluorosilane compound, is coated on the second hard coating layer 330 on the lower surface of the window substrate 310 to form a protection layer 340. Referring to FIG. 6C, UV light is irradiated to the protection layer 340 that is formed on the second hard coating layer 330. Referring to FIG. 6D, a surface property of the protection layer 340 is modified to be hydrophilic by the UV irradiation to form the auxiliary adhesive layer 350.

As illustrated in FIG. 6B, a layer 340 that is the same or substantially similar to the protection layer 340 on the first hard coating layer 320 is formed on the second hard coating layer 330. Additional description pertaining to FIG. 6B that is the same or substantially similar to that provided above with reference to FIG. 6A may be omitted herein for conciseness.

As illustrated in FIG. 6C, UV light is irradiated to the protection layer 340 on the second hard coating layer 330. A wavelength of the irradiated UV light may be, for example, in a range of about 100 nm to about 400 nm. A UV irradiation period of time may be, for example, in a range of about 1 second to about 30 minutes.

UV radiation may be classified into ultraviolet A ("UVA") in a range of about 315 nm to about 400 nm, ultraviolet B ("UVB") in a range of about 280 nm to about 315 nm, ultraviolet C ("UVC") in a range of about 200 nm to about 280 nm, vacuum ultraviolet ("VUV") in a range of about 100 nm to about 200 nm, and the like, based on the wavelength thereof. In addition, as represented in the following Equation 1, light energy E from UV radiation is inversely proportional to the wavelength λ of the UV light, wherein as the wavelength λ decreases, light energy E increases.

Equation 1:

$$E = h\frac{c}{\lambda}$$

• $E$: Light energy

• $h$: Planck constant

• $c$: Velocity of light

• $\lambda$: Wavelength of light

In more detail, UVA is generally used to cure an optically clear resin ("OCR") and an optically clear adhesive ("OCA"), which may be used in a lamination process of adhering a window and a display panel to one another, and has relatively high transmittance and relatively small energy. UVB is similar to natural light, and is commonly used in polymerization, along with UVA. UVC is generally used for rapid surface curing or for the purpose of sterilization. VUV may only be used in a vacuum state and has relatively large energy and relatively low transmittance.

UV light that has a relatively short wavelength has relatively low transmittance and, thus, such UV light may not be transmitted through glass. When a plastic window substrate is utilized, a major component may be polycarbonate ("PC"), and thus, UV light may not be transmitted in all wavelength ranges.

As such, according to one or more exemplary embodiments of the present invention, when UV light is irradiated to the protection layer 340 on the second hard coating layer 330 of the window substrate 310, the UV light being irradiated may modify the surface property of the protection layer 340 but may not affect the window substrate 310.

In some exemplary embodiments, UV light in all wavelength ranges may be irradiated to modify the surface property of the protection layer 340 on the second hard coating layer 330, and a UV irradiation period of time may vary based on the type of the UV light being irradiated. For example, when UV light having a large amount of energy is irradiated, a hydrophilic surface treatment may be performed within a relatively short period of time. Some examples of time periods of irradiation include:

VUV (100 nm to 200 nm): Large energy. A few seconds to tens of seconds;

UVC (200 nm to 280 nm): Medium energy. Tens of seconds to a few minutes; and

UVA (315 nm to 400 nm): Small energy. A few minutes to tens of minutes.

A variation in the surface property of the protection layer 340 on the second hard coating layer 330 is described further below with reference to FIGS. 7 and 8.

Figure 7:
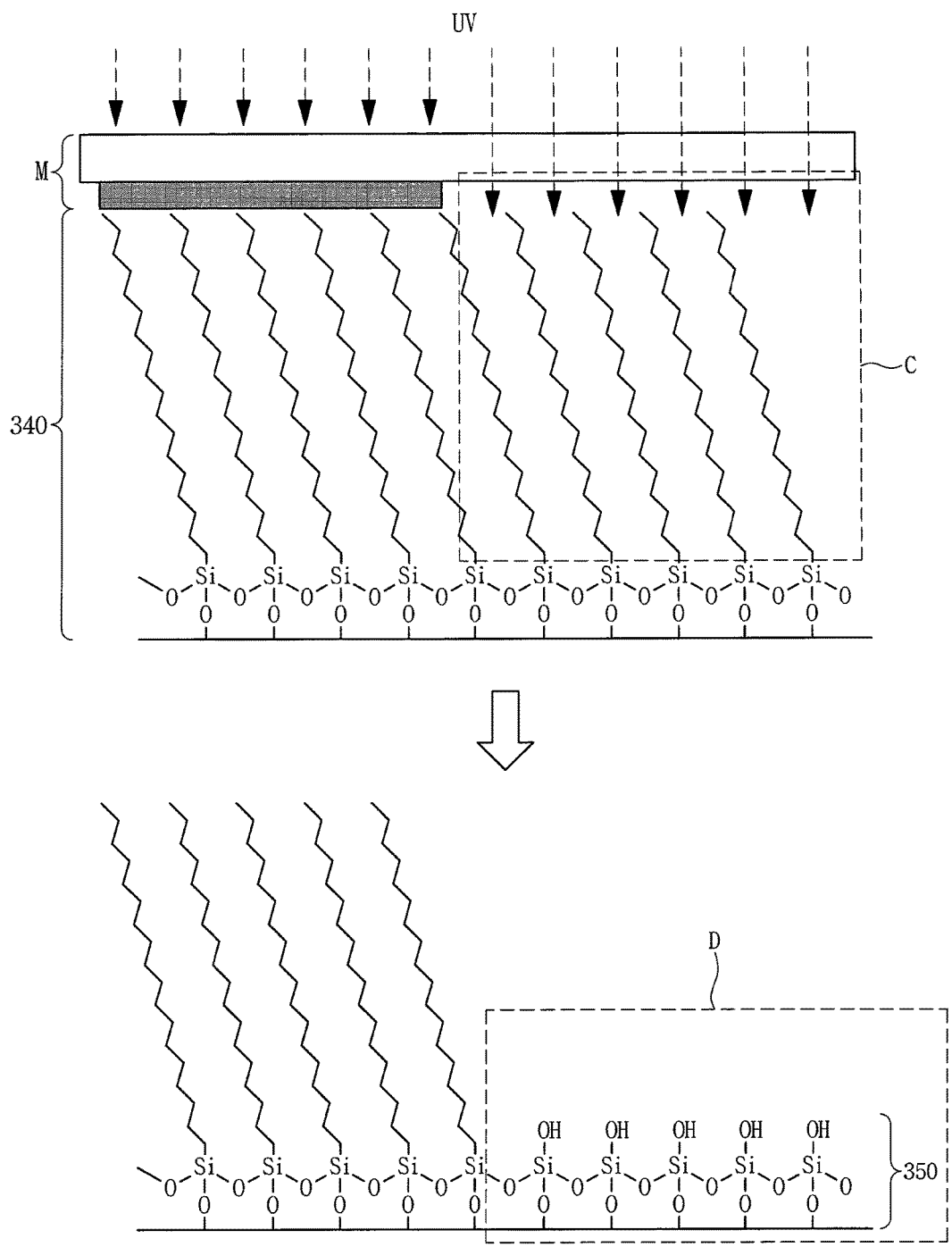
FIG. 7 is a mimetic view illustrating a variation in a surface property of a protection layer based on ultraviolet ("UV") treatment.

FIG. 7 is a mimetic view illustrating a variation in a surface property based on a UV treatment. FIG. 8 is a set of graphs illustrating a variation in absorbance over time according to a UV irradiation amount.

Referring to FIG. 7, when an alkylsilane compound or a perfluorosilane compound is utilized, a C—C bond, a C—H bond, and a C—F bond (refer to area "C") in a carbon chain portion of the alkylsilane compound or the perfluorosilane compound are decomposed by UV light to be changed to a dangling bond. As used herein, the term "dangling bond" refers to a bond in which an atom on a crystal surface or at a bonding portion in a crystal is in a state of being cut by coordinative unsaturation, unlike an atom within a perfect crystal. The cut portion reacts with moisture or oxygen in air and the surface of the cut portion is modified to be hydrophilic. For example, the area "C" in FIG. 7 indicates the carbon chain portion that is decomposed by UV light, and area "D" indicates a portion in which hydrophobicity (—CH$_3$) changes to hydrophilicity (—OH).

Figure 8:
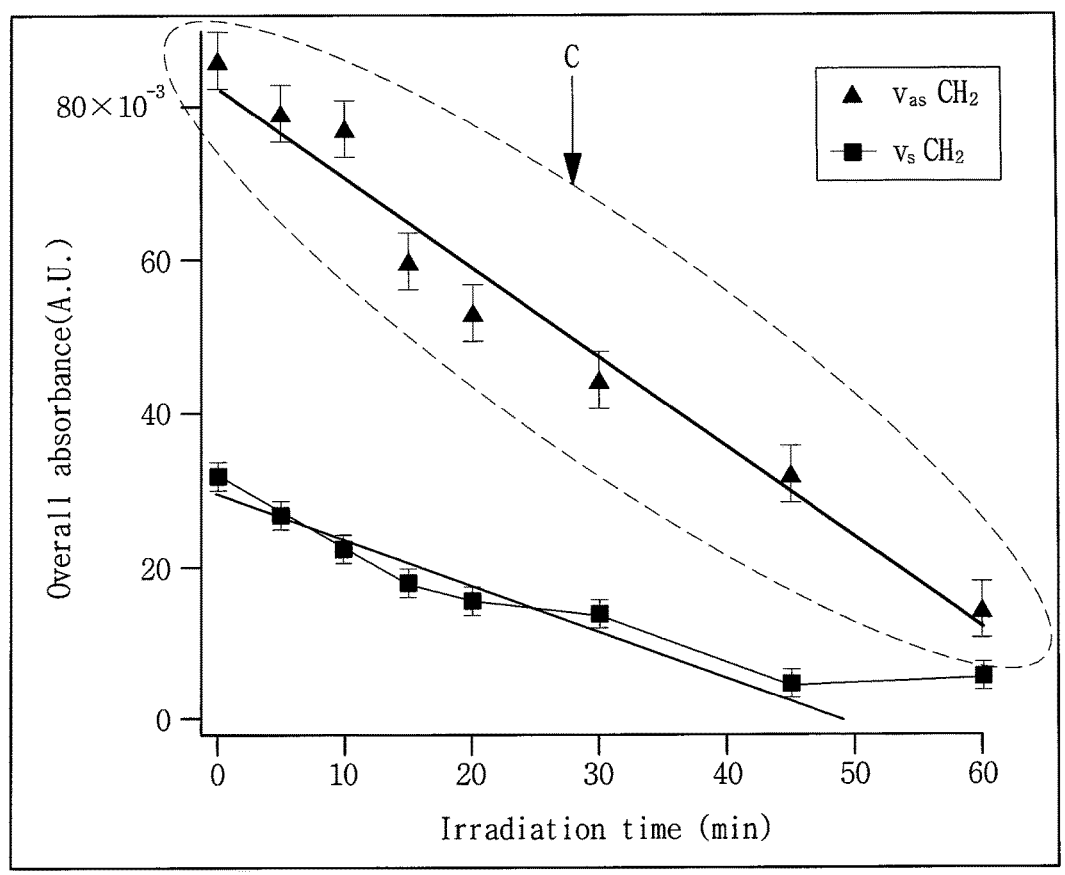
FIG. 8 is a set of graphs illustrating a variation in absorbance over time according to a UV irradiation amount.

Referring to FIG. 8, the set of graphs illustrate that as a UV irradiation period of time increases, absorbance decreases. Area "C" of the set of graphs represents an amount of the decomposed carbon chains based on a UV irradiation amount, and it may be verified that the amount of the decomposed carbon chains is proportional to the UV irradiation amount.

As described above, a surface of the protection layer 340 on the second hard coating layer 330 of the window substrate 310 is modified to have hydrophilicity by the UV treatment. For example, as illustrated in FIG. 6D, the auxiliary adhesive layer 350 having a hydrophilic surface is formed on the surface of the second hard coating layer 330 of the window substrate 310.

In the present exemplary embodiment, a process of forming the auxiliary adhesive layer 350 having a hydrophilic surface by forming the protection layer 340 on the second hard coating layer 330 and then performing the UV treatment thereto is disclosed. However, a process of modifying the surface property of the second hard coating layer 330 is not limited thereto, and the surface property may be modified by coating (e.g., directly coating) on the second hard coating layer 330, a material having a hydroxyl group (—OH) or a carboxyl group (—COOH), which is a hydrophilic functional group, at an end of the material.

As the auxiliary adhesive layer 350 is disposed on the second hard coating layer 330, a contact angle of the second hard coating layer 330 decreases and the adhesion of the second hard coating layer 330 increases. In more detail, the second hard coating layer 330 on which the protection layer 340 is disposed may have a contact angle in a range of about 90 degrees to about 180 degrees, whereas the second hard coating layer 330 on which the auxiliary adhesive layer 350 is disposed by the UV treatment may have a contact angle of about 60 degrees or less. Accordingly, the adhesion of the second hard coating layer 330 may be enhanced by the auxiliary adhesive layer 350.

Figure 6E:
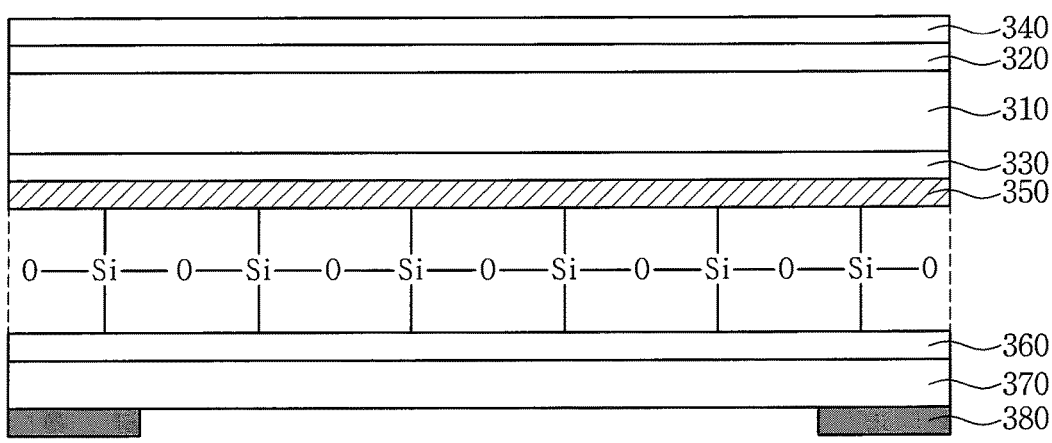

Referring to FIG. 6E, the light shielding layer 380 is formed in the non-display area NDA of the base film 370. The light shielding layer 380 is generally formed by printing an ink composition on the base film 370. However, the manner of forming the light shielding layer 380 is not limited thereto.

The base film 370, on which the light shielding layer 380 is formed, is attached to the second hard coating layer 330 that has enhanced adhesion due to the auxiliary adhesive layer 350. The auxiliary adhesive layer 350, which has a hydrophilic surface, and the second adhesive layer 360 of the base film 370 form a secure bond such that the base film 370 (e.g., a decoration film), on which the light shielding layer 380 is disposed and the second hard coating layer 330 are securely attached to one another to form the window 300. In some embodiments, the light shielding layer 380 may define the non-display area NDA of the window 300.

The window 300 may be manufactured as illustrated in FIGS. 6A to 6E.

As illustrated in FIG. 1, the display panel 200, on which the polarizer 400 is disposed, is disposed below the window 300. The first adhesive layer 500 is coated on a first surface (e.g., an upper surface) of the display panel 200, for example, on the polarizer 400. The first adhesive layer 500 may include (or may be formed of) a UV-curable resin. The display panel 200 and the window 300 may be attached to one another by the first adhesive layer 500.

As set forth above, according to one or more exemplary embodiments of the present invention, the display device may form the auxiliary adhesive layer by performing the hydrophilic surface treatment on the hard coating layer of the window substrate, thereby enhancing adhesion between the hard coating layer and a decoration layer (e.g., the base film), on which the light shielding layer is printed, and thus, preventing or reducing peeling-off that may occur between the hard coating layer and the decoration layer of the window.

Accordingly, the hard coating layer and the decoration layer of the window may be securely attached to one another.

From the foregoing, it will be appreciated that various embodiments in accordance with the present disclosure have been described herein for purposes of illustration, and that various modifications may be made without departing from the scope and spirit of the present teachings. Accordingly, the various embodiments disclosed herein are not intended to be limiting of the true scope and spirit of the present teachings. While one or more exemplary embodiments have been described with reference to the figures, it will be understood by those of ordinary skill in the art that various changes in form and details may be made therein without departing from the spirit and scope as defined by the following claims and their equivalents.

What is claimed is:

1. A display device comprising:
 a display panel configured to display an image;
 a window on the display panel, the window having a display area at which the image is displayed and a non-display area around the display area; and
 a first adhesive layer between the display panel and the window,
 wherein the window comprises:
  a window substrate on the display panel;

a first hard coating layer at a first surface of the window substrate;
a second hard coating layer at a second surface of the window substrate opposite to the first surface;
a protection layer on the first hard coating layer;
an auxiliary adhesive layer on the second hard coating layer;
a base film on the auxiliary adhesive layer; and
a second adhesive layer between the auxiliary adhesive layer and the base film,
wherein the auxiliary adhesive layer comprises at least one of a compound represented by the following Chemical Formula A and a compound represented by the following Chemical Formula B:

$$OH-(CH_2)_n-Si-X_3, \quad \text{Chemical Formula A:}$$

$$COOH-(CH_2)_n-Si-X_3, \quad \text{Chemical Formula B:}$$

wherein "n" is an integer in a range of 1 to 40, and "X" is alkoxy or halogen.

2. The display device of claim 1, wherein the window substrate comprises a plastic substrate.

3. The display device of claim 1, wherein the protection layer comprises at least one of a compound represented by the following Chemical Formula 1 and a compound represented by the following Chemical Formula 2:

$$CH_3-(CH_2)_n-Si-X_3; \quad \text{Chemical Formula 1:}$$

$$CF_3-(CF_2)_n-Si-X_3, \quad \text{Chemical Formula 2:}$$

wherein "n" is an integer in a range of 1 to 40, and "X" is alkoxy or halogen.

4. The display device of claim 3, wherein the protection layer comprises at least one of an alkylsilane compound and a perfluorosilane compound.

5. The display device of claim 4, wherein the protection layer comprises at least one selected from the group consisting of octyltrichlorosilane, octyltrimethoxysilane, decyltrimethoxysilane, decylmethyldichlorosilane, dodecylchlorosilane, dodecyltrichlorosilane, dodecyltrimethoxysilane, tetradecyltriethoxysilane, tetradecyltrichlorosilane, tetradecyltrimethoxysilane, perfluorooctyltrimethoxysilane, perfluorooctyltrichlorosilane, perfluorodecylmethyldichlorosilane, perfluorodecyltrimethoxysilane, perfluorodecyltriethoxysilane, perfluorododecyltrimethoxysilane, perfluorododecyltrichlorosilane, pefluorotetradecyltrichlorosilane, perfluorotetradecyltrimethoxysilane, and perfluorotetradecyltriethoxysilane.

6. The display device of claim 1, wherein the auxiliary adhesive layer comprises a siloxane bond.

7. The display device of claim 1, wherein the auxiliary adhesive layer has a contact angle of about 60 degrees or less.

8. The display device of claim 1, wherein the first hard coating layer and the second hard coating layer comprise an ultraviolet-curable hard coating composition.

9. The display device of claim 8, wherein the first hard coating layer and the second hard coating layer comprise at least one of an acrylate-based monomer and an inorganic compound.

10. The display device of claim 1, further comprising a light shielding layer at a surface of the base film in the non-display area.

11. The display device of claim 10, wherein the light shielding layer comprises a black printing layer.

12. The display device of claim 10, wherein the light shielding layer contacts the first adhesive layer.

13. The display device of claim 1, wherein the display panel comprises:
a first substrate;
a second substrate on the first substrate; and
a polarizer on the second substrate and facing the window.

14. The display device of claim 13, wherein the first adhesive layer is between the polarizer and the window.

* * * * *